United States Patent
Krechowiecki

(10) Patent No.: US 9,187,309 B1
(45) Date of Patent: Nov. 17, 2015

(54) FUEL BIB

(71) Applicant: Jodi Krechowiecki, Regina (CA)

(72) Inventor: Jodi Krechowiecki, Regina (CA)

( * ) Notice: Subject to any disclaimer, the term of this patent is extended or adjusted under 35 U.S.C. 154(b) by 0 days.

(21) Appl. No.: 14/320,335

(22) Filed: Jun. 30, 2014

Related U.S. Application Data

(63) Continuation-in-part of application No. 13/846,450, filed on Mar. 18, 2013, now Pat. No. 8,800,609.

(51) Int. Cl.
*B65B 1/04* (2006.01)
*B67D 7/32* (2010.01)
*B67D 7/04* (2010.01)
*B60K 15/04* (2006.01)

(52) U.S. Cl.
CPC .............. *B67D 7/3209* (2013.01); *B67D 7/04* (2013.01); *B60K 2015/0487* (2013.01)

(58) Field of Classification Search
CPC ............. B67D 7/04; B67D 7/3209; B60K 2015/0467; B60K 2015/048; B60K 2015/0487
USPC ............ 141/86, 88, 286, 331, 332, 338, 343, 141/340; 222/108; 280/770; 220/86.2
See application file for complete search history.

(56) References Cited

U.S. PATENT DOCUMENTS

| | | | | | |
|---|---|---|---|---|---|
| 5,571,249 | A | * | 11/1996 | Boylen | 141/86 |
| 5,738,154 | A | * | 4/1998 | Garvey, III | 141/86 |
| 5,765,604 | A | * | 6/1998 | Garvey, III | 141/86 |
| 5,878,795 | A | * | 3/1999 | Armellino | 141/86 |

\* cited by examiner

*Primary Examiner* — Jason K Niesz
(74) *Attorney, Agent, or Firm* — QuickPatents; Kevin Prince

(57) ABSTRACT

A fuel collection device for a fuel tank inlet conduit comprises a conduit that has a distal end adapted for insertion into a conduit end of the fuel tank inlet conduit, and a proximal end adapted for receiving a fuel nozzle therein and having an overflow aperture therethrough. A hollow annular chamber is fixed about the proximal end of the conduit for receiving any fuel flowing out of the overflow aperture. The chamber has a pour spout at an opposite side of the conduit from the overflow aperture. A fuel air vent collection device may be further included for use with boats having fuel air vents, which includes an attachment mechanism for fixing to the side of the vehicle at the air vent and a container having a fuel capture aperture therethrough, fixed with the attachment mechanism, and an opposing pour spout.

14 Claims, 5 Drawing Sheets

FUEL BIB

CROSS-REFERENCE TO RELATED APPLICATIONS

This application claims the benefit of U.S. Utility patent application Ser. No. 13/846,450, filed on Mar. 18, 2013, and incorporated herein by reference.

STATEMENT REGARDING FEDERALLY SPONSORED RESEARCH AND DEVELOPMENT

Not Applicable.

FIELD OF THE INVENTION

This invention relates to fuel dispensing, and more particularly to a fuel device for fuel tanks.

DISCUSSION OF RELATED ART

Refueling vehicles such as boats, automobiles, and the like, as well as filling gasoline containers, often results in fuel being spilled either on the vehicle or on the ground and into the environment. The fuel nozzle, for example, will often continue to drip even after the nozzle has been shut off. Further, when overfilling a fuel tank or container, significant spillage can occur out of the fuel inlet conduit and onto the vehicle or surrounding area.

The following prior art patents all teach devices that aim to prevent fuel from contacting the vehicle:

| U.S. Pat. No. | Issue Date | Inventor |
| --- | --- | --- |
| 4,817,691 | Apr. 4, 1989 | Lau |
| 3,992,051 | Nov. 16, 1976 | Hitch |
| 5,785,099 | Jul. 28, 1998 | Kashani |
| D315705 | Mar. 26, 1991 | Smith |

As perhaps best illustrated in Lau FIG. 4, and Kashani FIG. 3, such devices result in fuel being purposefully directed away from the vehicle and onto the ground. No means for collecting or recapturing such wasted fuel is provided in these prior art devices.

Other prior art patents teach means for not only diverting spilled fuel away from the vehicle, but also for collecting or recapturing such fuel. For example, U.S. Pat. No. 5,571,249 to Boylen on Nov. 5, 1996 teaches a complex fuel recovery system that returns spilled fuel back to the fuel pump. Such a device not only robs the user of the fuel they have already paid for, but such a device is necessarily fixed with the fuel pump and cannot travel with the vehicle or owner of the vehicle.

Other prior art patents teach a means for collecting spilled liquids from a dispenser or aperture, but do not provide for keeping such spilled liquids from contacting the vehicle, as follows:

| U.S. Pat. No. | Issue Date | Inventor | Ref. |
| --- | --- | --- | --- |
| 6,532,888 | Mar. 18, 2003 | Enik | FIG. 6 |
| 6,279,781 | Aug. 28, 2001 | Konar | FIG. 1 |
| 5,027,965 | Jul. 2, 1991 | Dumars | FIG. 1 |
| 4,802,514 | Feb. 7, 1989 | Morse | FIG. 1 |

Still other prior art devices teach a collection device for spilled fuel, or the like, that must be kept in a vehicle trunk, or the like, when not in use, as follows:

| U.S. Pat. No. | Issue Date | Inventor | Ref. |
| --- | --- | --- | --- |
| 4,082,125 | Apr. 4, 1978 | Wilson et al. | FIG. 2 |
| 7,216,778 | May 15, 2007 | Kaeb | FIG. 1 |
| 7,543,612 | Jun. 9, 2009 | Angel et al. | FIG. 1 |

Such products do not allow for the easy reintroduction of fuel back into the fuel tank, but rather assume that the recaptured fuel is to be discarded.

In my previous Application, of which this present Application is a CIP, the flexible tray and front cover therefore are not well-suited for some types of vehicles, such as motor boats having a vertically-oriented fuel tank inlet conduit. As such, even with my previous device, fuel can sometimes spill from such vehicles.

Therefore, there is a need for a device that not only prevents spilled fuel from contacting the vehicle, but also recaptures such spilled fuel and provides a means for easily reintroducing such recaptured fuel back into the fuel inlet conduit of the vehicle, even with vehicles having a substantially vertically-oriented fuel tank inlet conduit. Further, such a needed device would provide means for use with boats for recapturing fuel spilled from a fuel tank air vent upon overfilling of the tank. Still further, such a needed device would be relatively easy to manufacture, use and store. The present invention accomplishes these objectives.

SUMMARY OF THE INVENTION

The present invention is a fuel collection device for a fuel tank inlet conduit of the type having a conduit end for receiving a fuel nozzle. The fuel collection device comprises a liquid-impervious, elongated conduit that has an open proximal end and an open distal end. The distal end is adapted for insertion into the conduit end of the fuel tank inlet conduit. The proximal end is adapted for receiving the fuel nozzle therein. The conduit is adapted for conveying fuel between the fuel nozzle and the fuel tank inlet conduit. The proximal end of the conduit includes at least one overflow aperture therethrough.

A hollow annular chamber is fixed about the proximal end of the conduit and is adapted to receive the fuel flowing out of the at least one overflow aperture of the conduit therein. The chamber has a pour spout therethrough, preferably at an opposite side of the conduit from the at least one overflow aperture.

In one embodiment, the proximal end of the conduit includes an elastomeric, annular seal adapted to receive the fuel nozzle therethrough. The annular seal deforms around the fuel nozzle to seal the space between the open proximal end of the conduit and the fuel nozzle.

In the case of a vehicle having the fuel tank inlet conduit as well as a fuel air vent at a side of the vehicle, such as with many motor boats, the fuel collection device may form part of a fuel collection system along with a fuel air vent collection device. The fuel air vent collection device includes an attachment mechanism adapted to be selectively fixed to the side of the vehicle about the air vent, and further includes a container fixed therewith and having a fuel capture aperture therethrough and an opposing pour spout.

The attachment mechanism of the fuel air vent collection device preferably includes two elastomeric suction cups fixed on either side of an attachment aperture aligned with the fuel capture aperture. Preferably the attachment mechanism is made from an elastomeric material that flexes so that the suction cups may be optimally positioned against the side of the vehicle. Further, the container is preferably pivotally attached to the attachment mechanism at the attachment aperture.

The present invention is a device that not only prevents spilled fuel from contacting the vehicle, but also recaptures such spilled fuel and provides a means for easily reintroducing such recaptured fuel back into the fuel inlet conduit of the vehicle. Further, the present invention provides means for use with boats for recapturing fuel spilled from a fuel tank air vent upon overfilling of the tank. The present invention is relatively easy to manufacture, use and store. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
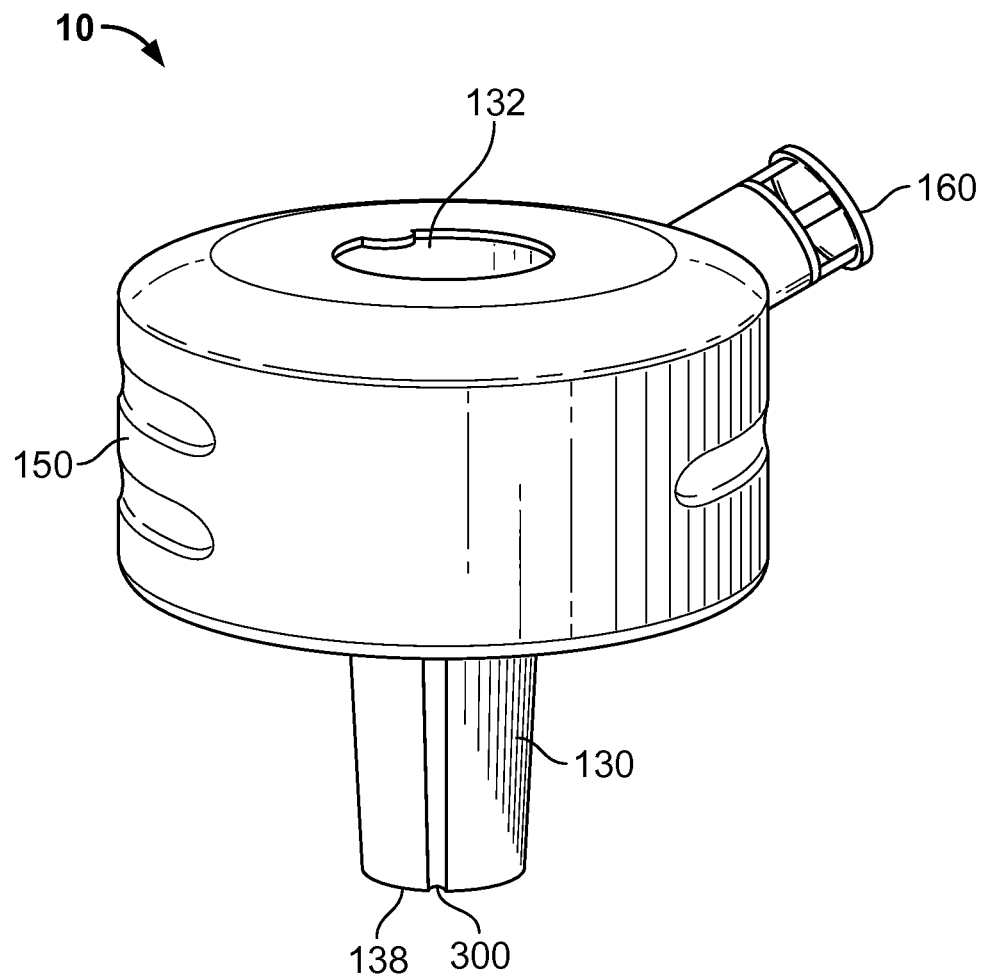
FIG. 1 is a perspective view of the invention.
Figure 2:
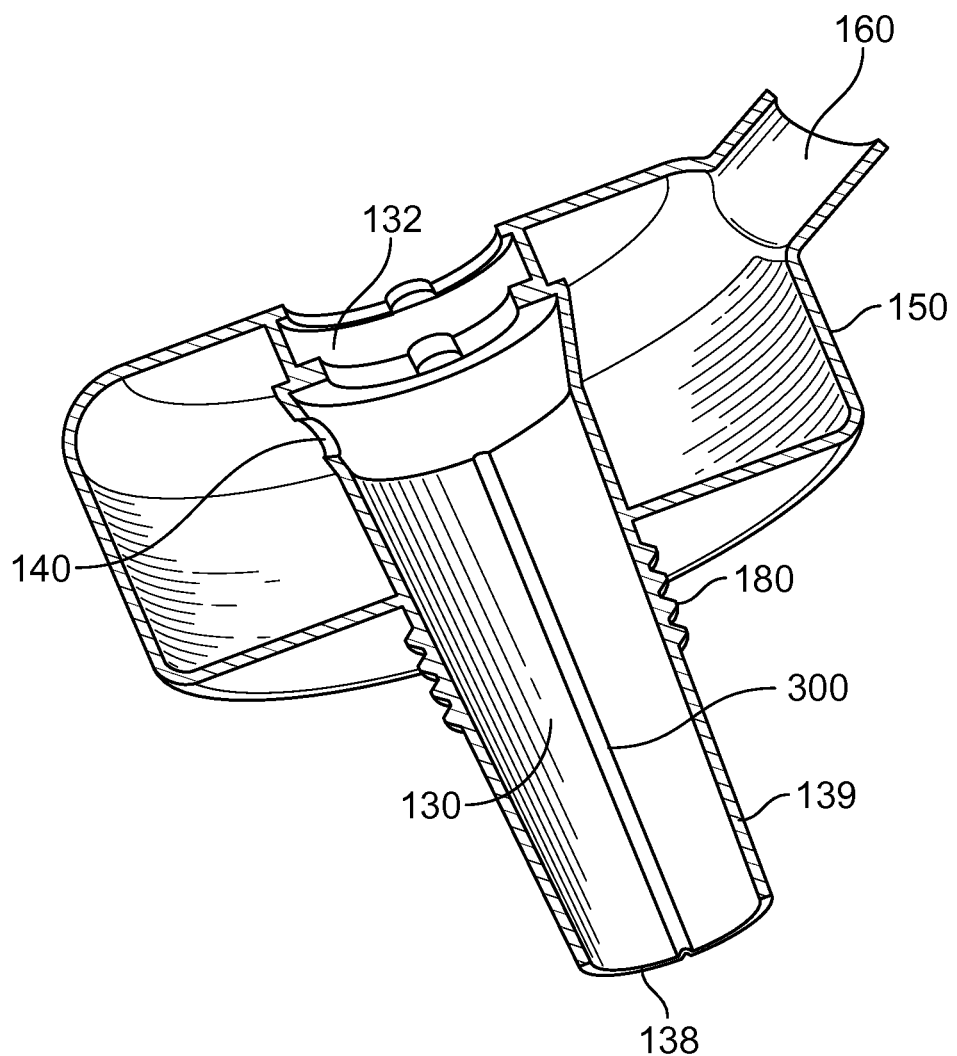
FIG. 2 is a cross-sectional view of the invention, taken across a diameter of an annular chamber that bisects a pour spout of the chamber.
Figure 3:
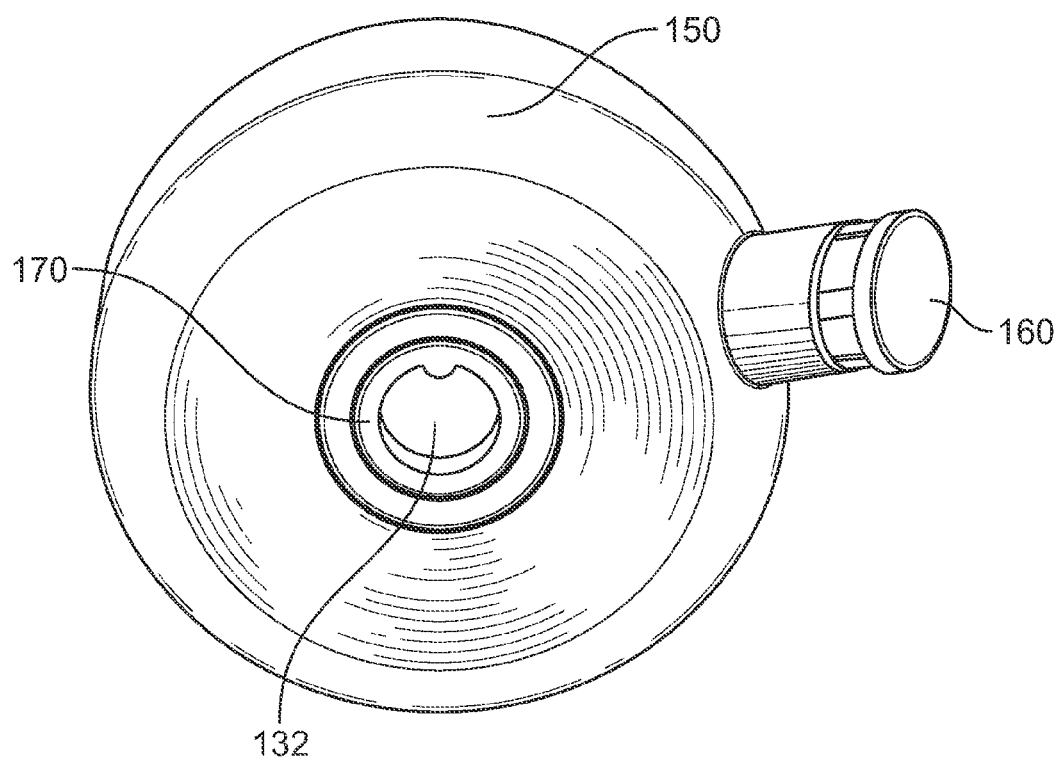
FIG. 3 is a top perspective view of FIG. 1 and illustrating an elastomeric seal at a proximal end of a conduit running through the annular chamber.

FIGS. 1-3 illustrate a fuel collection device 10 for a fuel tank inlet conduit 20 of the type having a conduit end 25 for receiving a fuel nozzle 28. The fuel collection device 10 comprises a liquid-impervious, elongated conduit 130 that has an open proximal end 132 and an open distal end 138. The distal end 138 is adapted for insertion into the conduit end 25 of the fuel tank inlet conduit 20. The proximal end 132 is adapted for receiving the fuel nozzle 28 therein. The conduit 130 is adapted for conveying fuel 21 between the fuel nozzle 28 and the fuel tank inlet conduit 20. The proximal end 132 of the conduit 130 includes at least one overflow aperture 140 therethrough. Further, a chain channel 300 (FIG. 1) may be included to accommodate a chain (not shown) that may affix the vehicle 20 to the fuel cap 27 while the conduit 130 is inserted into the fuel tank inlet conduit 20.

A hollow chamber 150, preferably annular in shape, is fixed about the proximal end 132 of the conduit 130 and is adapted to receive the fuel 21 flowing out of the at least one overflow aperture 140 of the conduit 130 therein. The chamber 150 has a pour spout 160 therethrough, preferably at an opposing side of the at least one overflow aperture 140. Such a pour spout 160 may be removable (FIG. 1) and include a fuel filter material (not shown) to filter any large contaminates from the fuel 21 before pouring.

In one embodiment, the proximal end 132 of the conduit 130 includes an elastomeric, annular seal 170 (FIGS. 3 and 6) adapted to receive the fuel nozzle 28 therethrough. The annular seal 170 deforms around the fuel nozzle 28 to seal the space between the open proximal end 132 of the conduit 130 and the fuel nozzle 28. The annular seal 170 also inhibits the fuel 21 from exiting the conduit 130 due to fuel blowback of pressurized fuel systems.

In one embodiment, the conduit 130 further includes a plurality of resilient ribs 180 projecting away from an outside surface 139 thereof, below the chamber 150. Such resilient ribs 180 are adapted for resiliently engaging threads of the fuel tank inlet conduit 20 (FIG. 6).

Figure 4:
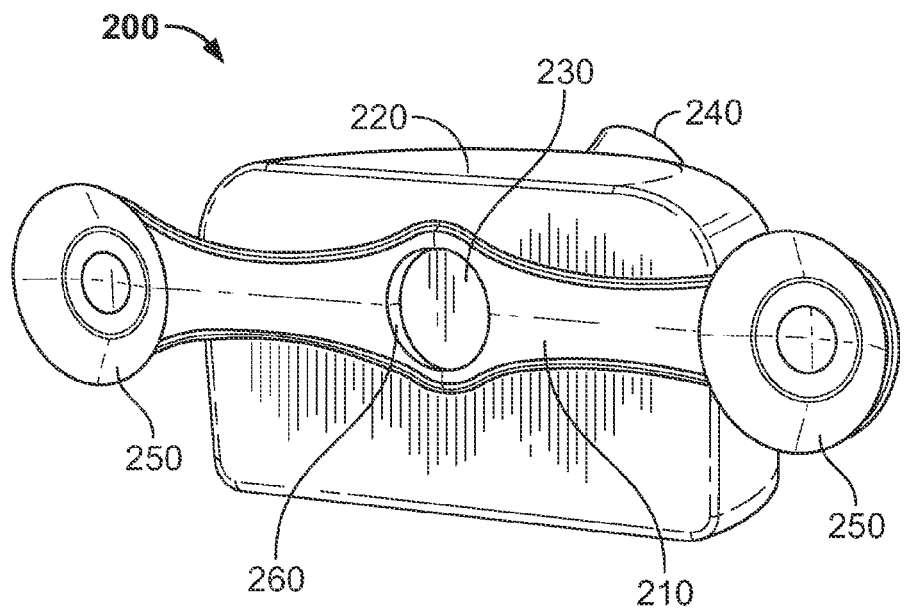
FIG. 4 is a rear perspective view of a fuel air vent collection device of the invention.
Figure 5:
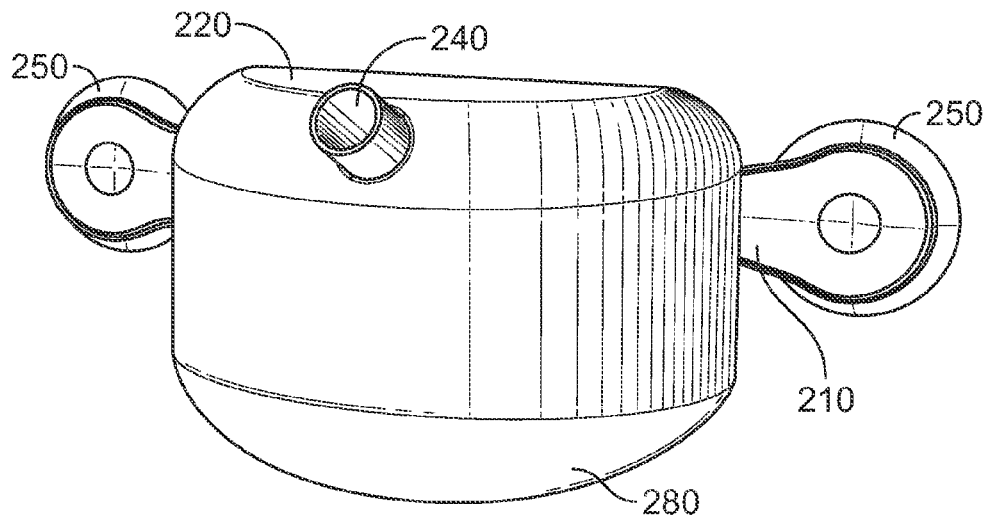
FIG. 5 is a front perspective view of FIG. 4.
Figure 6:
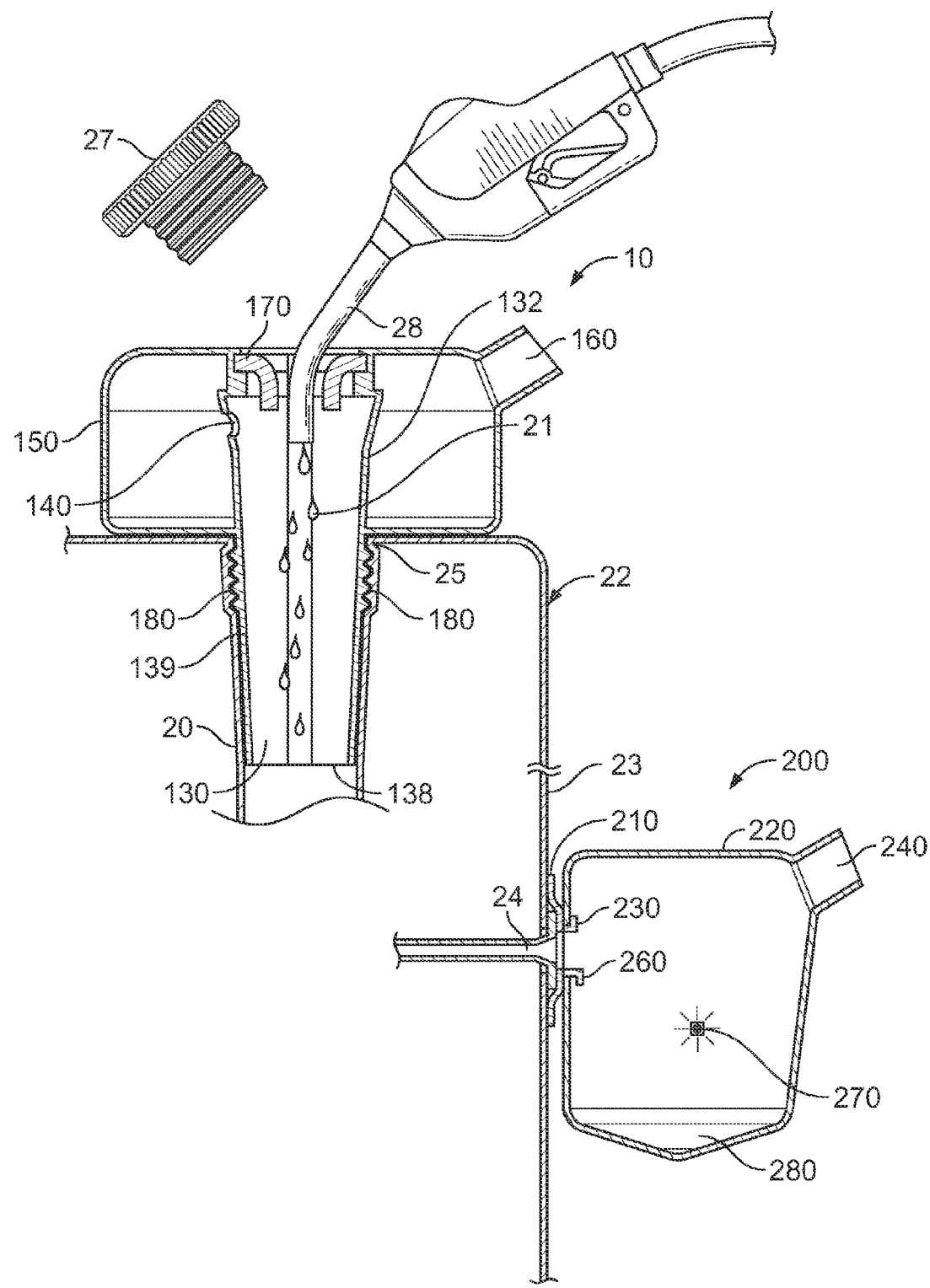
FIG. 6 is a cross-sectional view of the invention in-use on a vehicle having a fuel air vent.

In the case of a vehicle 22 having the fuel tank inlet conduit 20 as well as a fuel air vent 24 at a side 23 of the vehicle 22, such as with many motor boats, the fuel collection device 10 may further include a fuel air vent collection device 200 (FIGS. 4-6). The fuel air vent collection device 200 includes an attachment mechanism 210 adapted to be selectively fixed to the side 23 of the vehicle 22 about the air vent 24, and further includes a container 220 fixed therewith and having a fuel capture aperture 230 therethrough and an opposing pour spout 240.

The attachment mechanism 210 of the fuel air vent collection device 200 preferably includes two elastomeric suction cups 250 fixed on either side of an attachment aperture 260 aligned with the fuel capture aperture 230. Preferably the attachment mechanism 210 is made from an elastomeric material that flexes so that the suction cups 250 may be properly positioned against the side 23 of the vehicle 22. Further, the container 220 is preferably pivotally attached to the attachment mechanism 210 at the attachment aperture 260 (FIG. 6) with an elastomeric or plastic grommet 265 (FIGS. 4 and 6).

The container 220 preferably has a center of gravity 270 below the attachment aperture 260, the pour spout 240 being position above the attachment aperture 260. As such, the pour spout 240 is urged to maintain an upward orientation by gravity. The container 220 includes a central well 280 so that the pour spout 240 is urged to maintain an upward orientation by gravity even as fuel 21 enters the container 220 through the attachment aperture 260.

Preferably the conduit 130 and chamber 150 are integrally formed with a non-opaque plastic material, such that a fuel level within the chamber 150 can be visually ascertained. Likewise, with the fuel collection system comprising the fuel collection device 10 and the fuel air vent collection device 200, fuel air vent collection device 200 is also preferably formed from a non-opaque plastic material so that a fuel level within can be visually ascertained.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A fuel collection device for a fuel tank inlet conduit of the type having a conduit end for receiving a fuel nozzle, and a screw cap adapted for selectively sealing the conduit end, the fuel collection device comprising:
    a liquid-impervious, elongated conduit having an open proximal end and an open distal end, the distal end adapted for insertion into the conduit end of the fuel tank inlet, the proximal end adapted for receiving the fuel nozzle therein, the conduit adapted for conveying fuel between the fuel nozzle and the fuel tank inlet conduit, the proximal end of the conduit including an overflow aperture therethrough; and
    a hollow chamber fixed about the proximal end of the conduit and adapted to receive liquids flowing out of the overflow aperture of the conduit therein, the chamber further having a pour spout;
    whereby with the distal end of the conduit fixed within the fuel tank inlet conduit and the fuel nozzle inserted into the proximal end of the conduit and dispensing fuel, fuel is conveyed between the fuel nozzle and the fuel tank inlet conduit, any fuel leaking past the fuel nozzle towards the proximal end flowing through the overflow aperture and into the chamber, thereafter excess fuel contained in the chamber may be poured out of the chamber at the pour spout.

2. The device of claim 1 wherein the chamber is annular in shape.

3. The device of claim 1 wherein the pour spout is fixed through the chamber at a side opposite of the overflow aperture of the conduit.

4. The device of claim 1 wherein the proximal end of the conduit includes an elastomeric, annular seal adapted to receive the fuel nozzle therethrough and deform around the fuel nozzle to seal the space between the open proximal end of the conduit and the fuel nozzle.

5. The device of claim 1 wherein the conduit further includes a plurality of resilient ribs projecting away from an outside surface thereof and adapted for engaging threads of the fuel tank inlet conduit.

6. A fuel collection system for a vehicle having a fuel tank inlet conduit of the type having a conduit end for receiving a fuel nozzle, a screw cap adapted for selectively sealing the conduit end, and a fuel air vent at a side of the vehicle, the fuel collection system comprising:
    a fuel collection device having a liquid-impervious, elongated conduit having an open proximal end and an open distal end, the distal end adapted for insertion into the conduit end of the fuel tank inlet, the proximal end adapted for receiving the fuel nozzle therein, the conduit adapted for conveying fuel between the fuel nozzle and the fuel tank inlet conduit, the proximal end of the conduit including an overflow aperture therethrough; and a hollow chamber fixed about the proximal end of the conduit and adapted to receive liquids flowing out of the overflow aperture of the conduit therein, the chamber further having a pour spout; and
    a fuel air vent collection device having an attachment mechanism adapted to be selectively fixed to the side of the vehicle about the air vent, and a container fixed therewith, having a fuel capture aperture therethrough and an opposing pour spout;
    whereby with the distal end of the conduit fixed within the fuel tank inlet conduit and the fuel nozzle inserted into the proximal end of the conduit and dispensing fuel, fuel is conveyed between the fuel nozzle and the fuel tank inlet conduit, any fuel leaking past the fuel nozzle towards the proximal end flowing through the overflow aperture and into the chamber, thereafter excess fuel contained in the chamber may be poured out of the chamber at the pour spout; and whereby with the fuel air vent collection device attached at the air vent of the vehicle, fuel exiting the fuel air vent is collected into the container, thereafter excess fuel contained in the container may be poured out of the chamber at the pour spout.

7. The system of claim 6 wherein the chamber is annular in shape.

8. The system of claim 6 wherein the pour spout is fixed through the chamber at a side opposite of the overflow aperture of the conduit.

9. The system of claim 6 wherein the proximal end of the conduit includes an elastomeric, annular seal adapted to receive the fuel nozzle therethrough and deform around the fuel nozzle to seal the space between the open proximal end of the conduit and the fuel nozzle.

10. The system of claim 6 wherein the attachment mechanism of the fuel air vent collection device includes two opposing elastomeric suction cups fixed on either side of an attachment aperture aligned with the fuel capture aperture of the container.

11. The system of claim 10 wherein the attachment mechanism is comprised of an elastomeric material.

12. The system of claim 10 wherein the container is pivotally fixed with the attachment mechanism at the attachment aperture of the attachment mechanism and the fuel capture aperture of the container.

13. The system of claim 12 wherein the center of gravity of the container and the pour spout thereof are on opposing sides of the fuel capture aperture, whereby the pour spout is urged to maintain an upward orientation by gravity.

14. The system of claim 13 wherein the container includes a central well, whereby the pour spout is urged to maintain an upward orientation by gravity as fuel enters the container.

\* \* \* \* \*